Nov. 16, 1926.

C. WILHJELM 1,606,858

TEMPERATURE REGULATING APPARATUS

Filed Jan. 15, 1924    3 Sheets-Sheet 1

Christian Wilhjelm    Inventor

By his Attorney

Ivan E. A. Konigsberg

Christian Wilhjelm, Inventor
By his Attorney
Ivan E. A. Königsberg

Nov. 16, 1926.

C. WILHJELM 1,606,858

TEMPERATURE REGULATING APPARATUS

Filed Jan. 15, 1924     3 Sheets-Sheet 3

Christian Wilhjelm Inventor

By his Attorney
Ivan E. A. Konigsberg

Patented Nov. 16, 1926.

1,606,858

UNITED STATES PATENT OFFICE.

CHRISTIAN WILHJELM, OF PHILADELPHIA, PENNSYLVANIA.

TEMPERATURE-REGULATING APPARATUS.

Application filed January 15, 1924. Serial No. 686,281.

This invention relates to a method and apparatus for regulating the temperature in furnaces and ovens. The invention is described in connection with an electric furnace as a convenient illustration thereof, not as indicating the exclusive adaptability of the invention to such furnaces. In cases where the furnace is heated by oil, gas or other fuel, the invention may be used with equal advantages.

Heretofore it has been the practise to operate the switches (or valves) which control the supply of electric current (or of the fuel supply) by suitable mechanisms operable from a pyrometer or other indicating device at the time the latter indicates a variation plus or minus from the temperature required in any given case.

It is, however, a fact, that in most, if not all, cases, it is necessary to operate the switches (or valves) before the indicating device actually indicates the change in the temperature. This is due to the fact that there is a difference in the temperature of the heat supplying unit and that registered by a thermocouple or other registering element.

An example will make this clear. Assume an electric furnace having a heating coil, a thermocouple or other registering device and a pyrometer or indicator which in turn controls the line switch to the coil. It will readily be seen, that when the thermocouple registers, say 500°, the heating unit is many degrees higher in temperature, because it takes time for the thermocouple to register while the coil is being constantly heated and consequently has a higher temperature. At times this difference in temperature may reach as high as 100°. If now the pyrometer, showing 500°, operates to open the line switch, the temperature of the thermocouple and furnace may increase, say 10°, due to the fact that the coil continues to give off heat after the supply has been cut off, or, from another view point, the temperature of the thermocouple will keep on increasing until the same temperature prevails at all locations in the furnace. The same thing is of course true on the minus side or when the temperature decreases, so that as a matter of fact the temperature will continue to vary plus or minus, say 10° or more from what is required in the particular case.

The object of the invention is to prevent the variations referred to and obtain control or regulation at an even given temperature. The variations in temperature between what may be called the element of supply within the furnace, i. e. the heating coil, burner or the like and the registering device is called the "temperature lag" in that the temperature of the one element "lags" behind that of the other element.

When a pyrometer is used for temperature indication and control it is provided with a so called contact, and a high and a low separate contact arranged above the common contact. Means such as a clock work mechanism is provided for periodically depressing an indicating pointer (which moves over a scale) to close either the high or the low contact on the common contact. The contact thus made is caused to close a circuit for operating suitable instrumentalities to open or close the line switch as the case may be.

My invention provides means for either causing the indicating pointer to read high or low (and close the high or low contact) ahead of time so as to actuate the controlling instrumentalities in like manner to "anticipate" as it were, the actual change in the temperature within the furnace and to "anticipate" the time of operation of the controlling instrumentalities.

The same result may be obtained by shifting or moving the contact table with respect to the indicating pointer to cause the anticipating operation to occur. This method possesses the advantage of providing a pyrometer which indicates correctly at all times, while, if the first named method is used, the pyrometer reading will include the anticipated number of degrees of variation. However, as this apparent error may be calculated or nearly always is known for a particular furnace, the apparent incorrect reading or indication is easily taken into consideration and accounted for in reading the pyrometer.

With the above objects in view my invention is embodied in an apparatus as hereinafter described and in the method practised in connection therewith, reference being had to the accompanying drawings in which Fig. 1 is a diagram showing an electric furnace provided with a controlling device according to this invention.

Figures 1, 2 and 3 illustrate devices in which the contact table referred to is moved with respect to the indicating pointer so that the reading of the pyrometer will be correct, although the contacts will be operated to anticipate the temperature lag.

Figures 4 and 5 illustrate devices in which the contact pointer itself is caused to move so as to anticipate the temperature lag and the reading of the pyrometer will indicate such lag, which therefore must be accounted for in order to arrive at the correct temperatures.

Both of these methods for accomplishing the objects of the invention have been pointed out in the foregoing introductory explanation.

Figure 1:
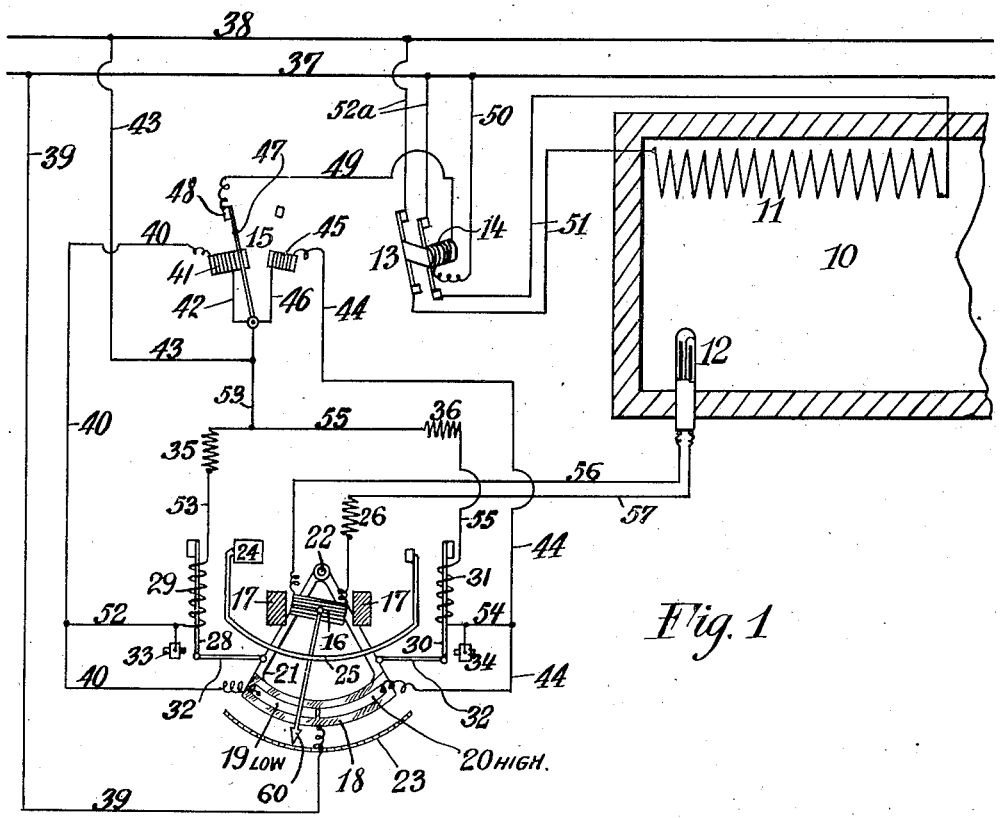

Referring to Figure 1 the reference numeral 10 denotes an electric furnace having a heating coil 11 and a registering device such as a thermocouple 12. 13 is a gravity operated switch which is held in closed position by a magnet or coil 14. 15 is an automatic circuit breaker. The pyrometer is illustrated in outline only and comprises the usual oscillating coil 16 supported between the two poles of a permanent magnet indicated at 17, 17. The contact table comprises the lower, common, contact 18, the low contact 19 and the high contact 20, which are mounted on a support 21 pivoted at 22. The pivot 22 coincides preferably with the center of the moving coil 16 but is shown apart therefrom for the sake of clearness. 23 is the pyrometer scale which is fixed with respect to the contact table. 24 is a clock mechanism for periodically operating the contact bar 25 to depress the pointer 60 secured to the coil 16, to periodically close the contacts on the contact table. The operation and function of a pyrometer is well understood in the art and require no detailed statement. 26 is the pyrometer resistance or calibrating coil.

The contact is adapted to be moved or operated around the pivot 22 by means of two bimetallic thermostats connected to the table. The two thermostats are each arranged to bend outward or away from the pyrometer when heated. The numeral 28 denotes the low contact thermostat having a heating coil 29. 30 is the high contact thermostat having a heating coil 31. The free ends of the thermostat are connected by links 32 to the contact table. 33 and 34 are adjustable contacts for shortcircuiting the thermostat heating coils. 35 and 36 are resistances for preventing overheating of said coils.

The line wires are denoted 37 and 38. Line 37 is connected by wire 39 to the common contact 18. The low contact 19 is connected by wire 40 to magnet 41 in the circuit breaker 15. The other side of said magnet is connected back to line 38 by wires 42 and 43. The high contact 20 is connected by wire 44 to magnet 45 in the circuit breaker, and the other end of said magnet is connected by wire 46 to the breaker arm 47 and wire 42. The breaker arm is adapted to contact with contact 48 which is connected by wire 49 to one end of the coil 14 aforesaid, the return connection of which is wire 50 to the line 37. Wires 51 connect switch 13 to the heating coil 11.

The low thermostat coil 29 is connected by wire 52 to wire 40 and magnet 41 and to the other side via wire 53 to the circuit breaker 15. The high thermostat coil 31 is connected by wire 54 to wire 44 and magnet 45 and to the other side via wire 55 to the circuit breaker. Adjustable contacts 33 and 34 are connected to wires 52 and 54 respectively.

The thermocouple circuit is from the thermocouple through wire 56 to pyrometer coil 16 and back through wire 57.

Assuming that the furnace is not in operation and the line open, the pointer 60 will indicate room temperature on the low side and be in the position shown. When now operation is started, the depressor bar 25 will commence depressing pointer 60 to close contact 19 on 18. This closes a circuit from line 37 through wire 39, contacts 18 and 19, wire 40, magnet 41 and back to line 38 via wire 43. Thus the magnet 41 is energized and attracts breaker arm 47 to close on contact 48. This completes a circuit as follows: Line 38, wire 43, breaker arm 47, contact 48, wire 49, switch coil 14 and wire 50 back to line 37. Consequently switch coil 14 becomes energized and operates to close the switch establishing a circuit through the line 37 and 38, through wires 52ª, the switch 13 and through wires 51 to the heating coil 11.

The completion of this last described circuit will cause the furnace to be heated and as the temperature increases, the thermocouple will be heated. This increases the potential at its binding posts and the deflection of the pyrometer pointer through the thermocouple circuit as set forth. Consequently the pointer 60 commences to move towards the high contact 20, the increasing temperature being read on scale 23.

The continued depression of the pointer 60 to close contacts 18 and 19 has no further influence on the circuit breaker 15 because the breaker arm 47 remains closed on contact 48 as is obvious. However the closing of contacts 18 and 19 completes periodically a circuit as follows:—Line 37, wire 39, contacts 18 and 19, wires 40 and 52, thermostat coil 29, wires 53 and 43 back to line 38. This will slowly cause the thermostat 28 to be heated, it will bend to the left in the drawing and through link 32 pull contact table support 21 to the left also, hence change the relationship between the table and the pointer, so that the latter will close the circuit at 18—19 ahead of the time when said contacts would be closed were they fixed with respect to the pointer.

It will be seen that without the oscillating or moving contact table, the pointer would move over the same closing the contacts periodically along the scale in accordance with the movements of the coil 16, that is, in response to the changes in temperature as registered by the thermocouple, and as pointed out above, it is impossible to obtain accurate control because of the lag between the temperature of the heating unit 11 and the temperature at or of the thermocouple.

By properly adjusting the thermostats and calculating the coils therefor, it is however, possible to move the contact table with respect to the scale and the pointer so that depressions of the latter occur so much in advance as to compensate for the lag referred to.

Or in other words, the length of time during which the pointer ordinarily would continue to close on the low contact is shortened by moving the contact a number of degrees equal to the number of degrees representing the temperature lag for that particular furnace installation. It is believed that this feature is broadly new.

Assuming that the temperature lag is ten degrees in a given case. Then the thermostat will be proportioned to move the contact table ten degrees along the scale, hence the pointer depression will occur ten degrees sooner than would otherwise be the case, and as a result, the "high" contact 20 will pass under the pointer 60 ten degrees ahead of time, contacts 18 and 19 will no longer be closed, hence the coil 29 will commence to cool and the thermostat to slowly move back into original position.

As soon as the high contact passes under the pointer, contacts 18 and high contact 20 will be closed by the pointer. Then a circuit will be closed through line 37, wire 39, 20, 18, wire 44, magnet 45, wires 46 and 43 to line 38. Hence magnet 45 will be energized and attract the arm 47 thus breaking the circuit through coil 14. The switch 13 will open by gravity and the heating unit 11 disconnected from the line.

If now the advance or movement of the degrees is correct for this particular furnace the excess heat in the heating coil 11 will bring the temperature in the furnace to just the right point and not higher, as would be the case without such advanced movement.

So it will be seen that because of the device disclosed, the temperature has been regulated not to rise higher than as required. Without the device the temperature would be ten degrees higher. It will also be noted that the pyrometer has at all times indicated the temperature registered by the thermocouple.

Continuing the description in the particular case as above, the pointer 60 will now be depressed on high and in addition to the circuit through magnet 45 as set forth, current also passes through wire 54, high thermostat coil 31 and wire 55 back to 53, 43 and the line, and as the coil 31 is heated, it will cause thermostat 30 to move to the right in the drawing and through link 32 the contact table is also moved to the right, which eventually brings low contact 19 under the pointer.

The circuit above described is then again established to energize magnet 41, close the switch 13 to close the line to the furnace circuit, and the unit 11 will again receive current and begin to heat the furnace. The thermostat 30 being correctly proportioned, it is obvious that the movement of the contact table by the thermostat 30 will anticipate the drop in the temperature due to the first breaking of the circuit through magnet 41 as described.

In other words the device will work to control the temperature by cutting off the line to the furnace ahead of time and reestablish the circuits to close the switch 13 ahead of the time when the temperature decreases.

In the event that the thermostats should become overheated in spite of the resistances 35 and 36, and have too great a movement, they will contact with contacts 33 and 34 and their heating coils automatically short circuited as a matter of safety.

Figure 2:
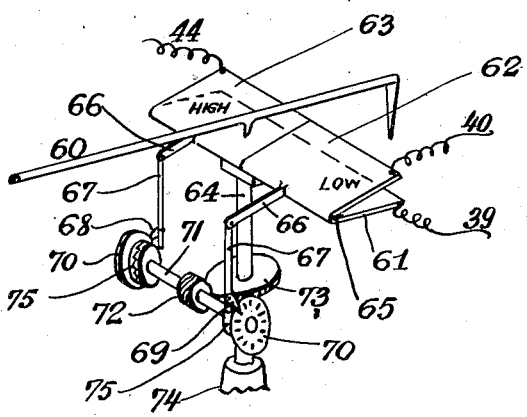
Fig. 2 is a view, somewhat diagrammatic in character, of an indicating device embodying a modification from the one shown in Figure 1.

Figure 2 illustrates a device for moving the contact table during operation by mechanical means. In this figure the lower common contact 61, the low contact 62 and the high contact 63 correspond to the contacts 18, 19 and 20 in Figure 1. Wire 39 is shown attached to the lower common contact 61, wire 40 is attached to the low contact 62 and wire 44 is attached to the high contact 63, the same as the corresponding wires are connected in Figure 1. The contact table in Figure 2 is mounted to rotate on a shaft 64. Each of the contacts 62 and 63 are hinged to the contact 61 at 65, springs raise the upper contacts from the lower contact after each depression by the pyrometer pointer 60, such springs are common in the pyrometer art and are not shown. Each contact 62 and 63 carries an arm 66 from which depends a rod 67 having a pawl 68 for the high contact and a similar pawl 69 for the low contact. The pawls are adapted to engage ratchets 70 on a shaft 71. The pawl 68 engages its ratchet on one side of said shaft, the pawl 69 engages its ratchet on the opposite side of the shaft 71. The latter carries a worm 72 which meshes with a worm wheel 73 on upright shaft 64. 74 indicates a supporting means for the device.

The operation is as follows:—When the low contact is depressed, its pawl 69 turns its ratchet 70 rotating the shaft 71 in one direction, and through the worm 72 and worm wheel 73 the shaft 64 and the contact table is operated in an arc the same as in Figure 1. When the high contact is depressed its pawl 68 similarly operates its ratchet 70 to rotate the upright shaft 64 and the contact table in the opposite direction the same as in Figure 1.

It will be understood that suitable slipping clutch elements indicated at 75 are interposed between the ratchets and the shaft 71 to prevent the one ratchet from opposing the operation of the other ratchet. But as this is common mechanical expediency details are not shown. The function of the contact table and pyrometer (represented by the pointer 60) is in Figure 2 precisely like the one illustrated in Figure 1.

Figure 3:
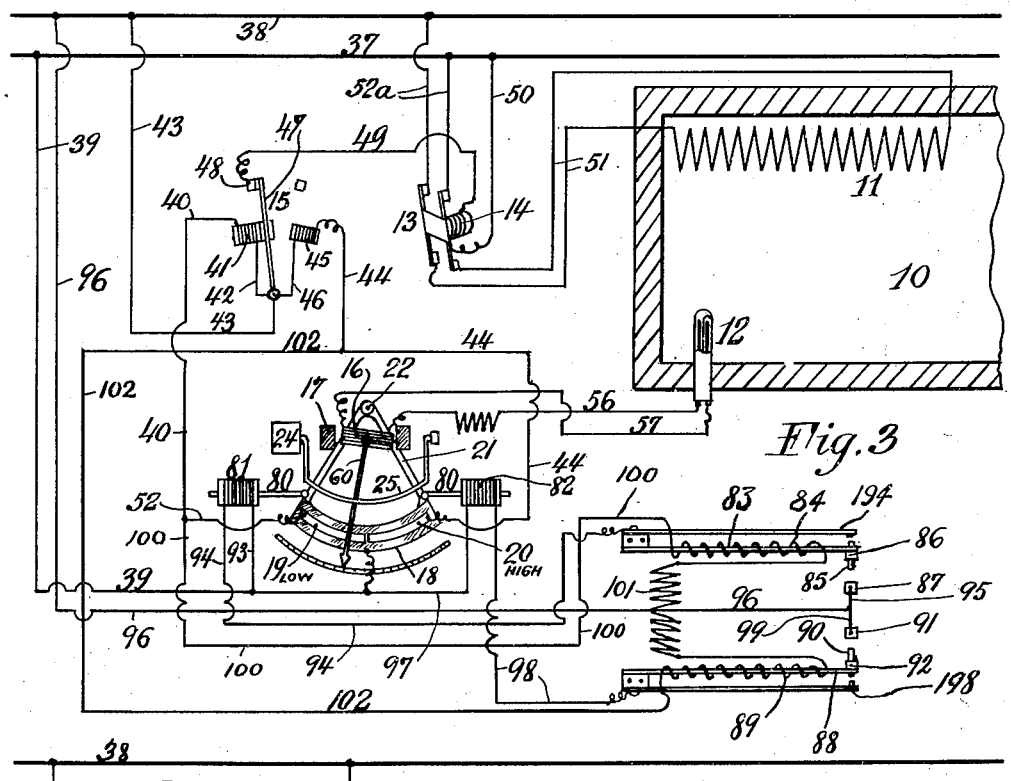
Fig. 3 is a diagrammatic view showing a still further modified construction of the indicating device.

Figure 3 illustrates a device in which the contact table 21 is operated by means of links 80, 80 secured to the cores of solenoids 81 and 82 or similar devices. In this instance I employ thermostats for controlling the operation of the solenoids. As shown there is provided a low contact thermostat 83 having a heating coil 84. When the latter is heated the thermostat contact 85, which of course is suitably insulated as at 86, moves to contact with the fixed post 87. Similarly there is a high contact thermostat 88 with a heating coil 89 and the thermostat contact 90 is adapted to contact with the fixed post, or contact, 91. Contact 90 is insulated as at 92.

Parts in Figure 3 corresponding to similar parts in Figure 1 are numbered correspondingly.

The solenoid circuits are as follows:— From line 37 via wire 39 to wire 93 to low solenoid 81, wire 94 to thermostat contact 85, and when the latter touches contact or post 87 then through wires 95 and 96 back to line 38. Similarly from line 37 via wire 39 to wire 97, high solenoid 82, wire 98 to thermostat contact 90, and when the latter touches contact 91, then to wires 99 and 96 back to the line 38.

From the foregoing as applied to Figure 3 it follows that the closing of the low contact 19 on common contact 18 operates the circuit breaker 15 and switch 14 to heat the furnace 10. Also, that as the temperature rises the thermocouple circuit 12, 50, 16 and 57 will operate the pointer 60.

Now when the low contact is closed current passes also from low contact 19, through wires 52 and 100 to coil 84, then through a balancing resistance 101 to wire 96 to line 38, then line 37, wire 39 to common contact 18 back to low contact 19. Hence the coil 84 is heated, the thermostat 83 begins to bend towards post 87 and when contacts 85 and 87 close the low solenoid circuit is completed as set forth above and the link 80 is drawn to the left in the drawing to move the contact table to compensate for the temperature lag as in Figure 1.

This movement continues as described for Figure 1 until the high contact passes in under the pointer 60 and a circuit is established through magnet 45 in the circuit breaker to break the latter to open the switch 14.

Depressions now continue on the high contact and periodically completes a circuit from high contact 20, wires 44 and 102 to thermostat coil 89, through the other half of balancing resistance 101, wire 96, line 38, line 37, wire 39 to common contact 18 back to high contact 20. Hence coil 89 becomes heated and the thermostat 88 closes contacts 90 and 91 completing the circuit through high solenoid 82 as set forth above, and the link 80 operates the contact table to the right in the drawing with a result similar to that described for Figure 1.

It should be noted as a matter of practical details that the thermostats and solenoids above described for Figures 1 and 3 are arranged to provide a slow movement commensurate with the gradual change in the temperature. Similarly the ratchets in Figure 2 will be provided with a relatively large number of teeth to effect a slow turning of the contact table.

Figure 4:
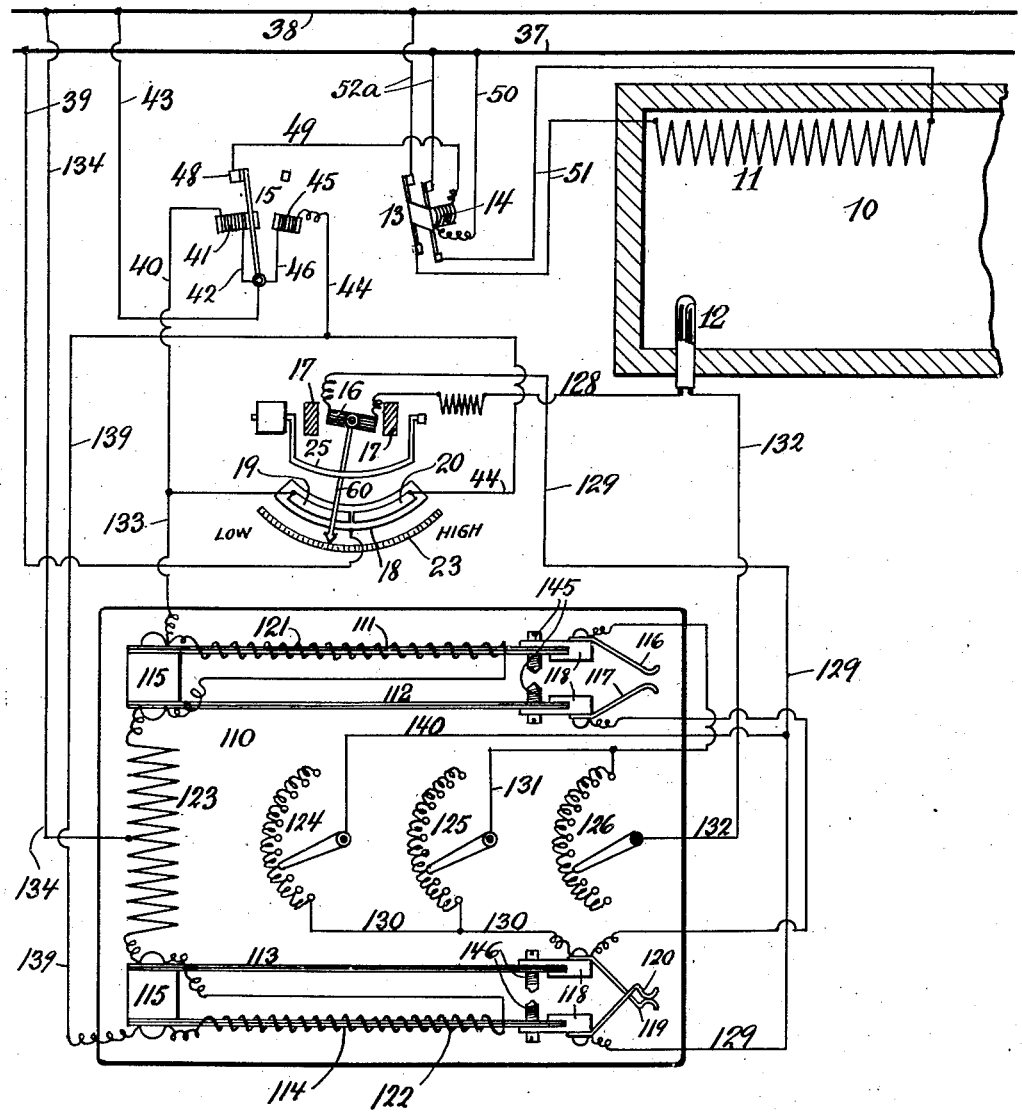

Figure 4 illustrates a device in which thermostats and certain resistance elements are arranged and operated to cause a deflection of the pyrometer pointer itself to anticipate the temperature lag. In this instance an ordinary controlling pyrometer is used, but in reading the pyrometer the temperature lag (which is known for a particular furnace installation) must be taken into account as a factor in reading the correct temperature.

Referring to the drawing there is provided a suitable base 110 upon which are mounted four strips or thermostats of suitable bi-metallic material and marked respectively 111, 112, 113 and 114. They are arranged in pairs and the several strips are insulated from each other by insulating blocks 115, 115. At their free ends thermostats 111 and 112 carry normally open contacts 116 and 117 suitably insulated as shown at 118. At the free ends of thermostats 113 and 114 are similarly mounted normally closed contacts 119 and 120. The thermostats are so built that they will all bend in the same direction at changes in the room temperature to compensate therefor for the sake of accuracy in operation.

Thermostat 111 is provided with an insulated heating coil 121 and thermostat 114 has an insulated heating coil 122. A suitable non-inductively wound resistance 123 is connected in series with the heating coils. There is also provided three adjustable resistances 124, 125 and 126. The resistance 123 is for the purpose of cutting down the current which passes through the other resistances.

The different circuits and their operation will be best understood in connection with the operation of the entire device. It will not be necessary to describe the operation of the thermocouple, the pyrometer, the circuit breaker and the line switch, as these parts are operated precisely as described in connection with Figure 1, and corresponding parts in Figure 4 are numbered to correspond with the same parts in Figure 1.

The thermocouple circuit is, however, somewhat different. In Figure 4 this circuit is as follows:—From the thermocouple 12 through wire 128, to the pyrometer, then wire 129 to contacts 120 and 119, wire 130, resistance 125, wire 131, resistance 126 and through wire 132 back to the thermocouple.

As the low contact 19 is being periodically closed as above described current will also pass through line 37, contacts 18 and 19, wire 133, heating coil 121, one half of resistance 123, wire 134 and back to the line 38. This will slowly heat the thermostat 111 and after a number of depressions the free end thereof will bend and close contacts 116 and 117. Now the thermocouple circuit will as before pass through 12, 128, the pyrometer, 129, 120 and 119, but from here it passes via wire 136 to 117, 116, wire 137, resistance 126, wire 132 and back to 12, thus cutting out resistance 125 of the pyrometer circuit and increasing the deflection of the pointer 60 a number of degrees corresponding to the resistance cut out.

From this point on the reading of the pyrometer is the said number of degrees too high. As the temperature increases and the pointer moves in over the high contact 20 it is evident that the pointer will close the high contact a like number of degrees ahead of the true temperature.

The current will now pass from line 37, wire 39, contacts 18 and 20 (high) and wire 44 to the circuit breaker and so forth as set forth above to open the line to the furnace coil 11.

If the advance or increased deflection of the pointer caused by the short circuiting of the resistance 126 in the pyrometer circuit is correct for this particular furnace, the excess heat in coil 11 will bring the furnace temperature to the required degree and not more than that, such as would be the case without the advance in the pointer movement.

In the meantime, the thermostat 111 will slowly cool off because low contact 19 is open, and if the thermostats 111 and 112 are correctly proportioned, contacts 116 and 117 will open just when the correct temperature is reached and the pointer would be on neutral between the high and the low contacts.

However, the high contact 20 is in the meantime being periodically closed. The first depression or closing thereof caused the opening of the circuit breaker and the switch and these elements remain open so long as the high contact 20 is being depressed. But this depression closes a circuit from line 37, wire 39, contacts 18 and 20, wires 44 and 139, through coil 122, one half of resistance 123 and wire 134 back to line 38. This closed circuit heats up thermostat 114 which opens contacts 119 and 120 as is obvious.

If we now follow the thermocouple circuit it will be through wire 128, the pyrometer, wire 129, wire 140 (because 119 and 120 are open) through resistance 124, wire 130, resistance 125, wire 131, resistance 126, wire 132 and back to 12. The current cannot pass around resistances 125 and 126 because the theromostat contacts are all open. Therefore we have added resistance 124 to the thermocouple circuit which of course will cause a decreasing deflection of the pyrometer pointer equal to the former increasing deflection, the resistances being alike.

Again should contacts 119 and 120 open before contacts 116 and 117 open, there will have been subtracted and added an equal amount of resistance in the circuit and pointer 60 will show correct reading. This means, that if there is practically no temperature lag in the furnace, the quick changing from high to low contact will cause contacts 116 and 117 to remain closed, and 119 and 120 to remain open and the device represented as a unit 110 is automatically electrically cut out.

Again, if there is a temperature lag and contacts 116 and 117 open before contacts 119 and 120, the added resistance 124 causes the pointer 60 to move back to operate the low contact slightly ahead of time to close the circuits to the furnace heating coil 11 before the temperature in the furnace drops below the given temperature.

The thermostats are further provided with adjustable contacts 145 and 146 respectively to prevent overheating and too much bending of the thermostats 111 and 114. Too much bending will eventually close contacts 145 and 146 which will short circuit the heating coils which will not be heated further regardless of how long the depressions occur on their respective tables.

The resistance 126 is introduced to keep the indication of the pyrometer correct. If for instance resistances 124 and 125 are adjusted to vary the pyrometer circuit resistance plus or minus five ohms, the resistance 126 will be set to cut out five ohms of the total thermocouple circuit.

Figure 5:
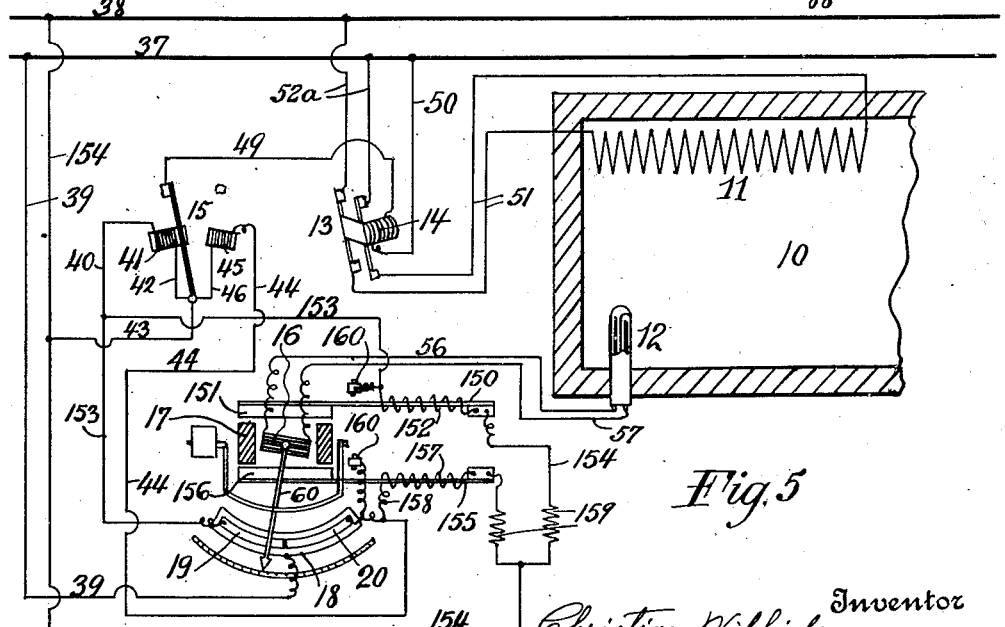
Figs. 4 and 5 are diagrammatic views showing still further modifications.

Figure 5 illustrates a further modification in which the deflection of the pyrometer pointer is varied in response to variation in the magnetic field across the poles 17, 17 of the permanent magnet. In this instance there is provided a thermostat 150 which carries a piece of soft iron 151. The thermostat is so arranged that when heated it will move the iron 151 away from the poles 17, hence the magnetic field thereof will be increased and this in turn will cause an increase or advance in the movement of the pointer 60. The heating coil 152 for this thermostat is therefore connected to the low contact 19 by way of wire 153, while the other side is connected to the line by wire 154.

Similarly another thermostat 155 carries a soft piece of iron 156 and has a heating coil 157. When the latter is heated the arrangement is such that the iron 156 is brought closer to the magnet poles 17 to decrease the magnetic field thereof to cause a corresponding decreasing deflection of the pointer.

In the first case the pointer will move on high ahead of time, in the second case on low ahead of time.

Coil 156 is connected to the high contact 20 by wire 158 and to the line by wire 154. Balancing resistances 159 are interposed between the coils and the line. Contacts 160 are adjustable and serve the purpose of mechanically limiting the movements of the thermostats, and cause the coils 152 and 157 to be short circuited when the thermostats have reached extreme positions as is obvious. The rest of the diagram in Figure 5 is like that of Figure 1 and the main elements are numbered correspondingly.

It is believed that the foregoing discloses my invention fully, although no attempt has been made to enter into mechanical or electrical details of construction, such matters being obviously within the scope of persons skilled in the art. It will be perceived that very little mechanism has been added to the control pyrometer in order to provide for means to accomplish the objects of the invention. Also, that very simple means may be used and the pyrometer left practically in its present commercial form in the industry.

The temperature lag may in some instances be very great, and the importance and advantages of the invention are readily realized when, for instance, a temperature lag of say 100° is encountered.

I believe it to be wholly novel to move a pyrometer contact table during the operation and for the purposes aforesaid. I am aware that pyrometer tables may be moved, that is set or adjusted before operation, but this is obviously an entirely different matter.

It is further clear, that the invention having been disclosed and understood, many changes may be made without departing from the principle of the invention and the scope of the appended claims.

I claim:

1. In a system for controlling the temperatures in electric furnaces including a controlling pyrometer having a contact table for controlling the supply circuit, the method of regulating said system, which method consists in advancing the operations of said contact table to compensate for the temperature lag within said furnace.

2. In a system for controlling the temperatures in electric furnaces including a controlling pyrometer having a contact table for controlling the supply circuit, the method of regulating said system, which method consists in operating the said contact table in response to a given anticipated temperature change within the furnace at any stage of the operation thereof.

3. In a system for controlling the temperatures in electric furnaces including a controlling pyrometer having a contact table for controlling the supply circuit, the method of regulating said system, which method consists in operating said pyrometer to open or close the supply circuit at a predetermined time in advance of an anticipated operation of said pyrometer in response to the temperature changes within said furnace.

4. In a system for controlling the temperatures in electric furnaces including a controlling pyrometer having a contact table for controlling the supply circuit, the method of regulating said system, which method consists in inserting in said system a plurality of electrical resistances and automatically including and excluding said resistances to cause said pyrometer to operate the supply circuit in anticipation of a change in the temperature within the said furnace.

5. In a system for controlling the temperature in electric furnaces including a controlling pyrometer having a contact table for controlling the supply circuit, the method of regulating said system, which method consists in first operating said contact table on the low contact thereof to anticipate a predetermined rise in temperature within the furnace, thereafter to operate said contact table on the high contact thereof to automatically open the supply circuit in said system to prevent a continued rise in temperature within the furnace from the supply circuit and then continue the operation of said contact table on the high contact thereof to anticipate a drop in the temperature within the furnace, whereby to again automatically close the supply circuit in said system.

6. In a system for controlling the temperatures in electrical furnaces including a controlling pyrometer having a moving indicator, operating coil within the magnetic field of a permanent magnet, the method of causing an increased movement of said coil and increased deflection of said indicator to control the supply circuit in anticipation of a temperature change within the furnace, which method consists in alternately and automatically changing the strength of the said magnetic field for the purposes aforesaid.

7. The combination with an electrical supply circuit and its controlling elements as set forth, of a pyrometer for operating said elements, a contact table in said pyrometer and means for operating said contact table to cause the said pyrometer to operate the said controlling elements in anticipation of a change in temperature within said furnace.

8. The combination with an electrical supply circuit and its controlling elements as set forth, of a pyrometer for operating said elements, a contact table in said pyrometer and electrical means for operating said contact table to cause the said pyrometer to operate the said controlling elements in anticipation of a change in temperature within said furnace.

9. The combination with an electrical supply circuit and its controlling elements as set forth, of a pyrometer for operating said elements, a contact table in said pyrometer and mechanical means for operating said contact table to cause the said pyrometer to operate the said controlling elements in anticipation of a change in temperature within said furnace.

10. The combination with an electrical supply circuit and its controlling elements as set forth, of a plurality of resistances connected to said circuit and elements and electrically operated means for automatically including and excluding certain of said resistances in the circuit to anticipate the operation of the said circuit controlling elements.

11. The combination with an electrical supply circuit and its controlling elements as set forth, of a plurality of resistances connected to said circuit and elements and a plurality of thermostats in said circuit, for automatically including and excluding certain of said resistances in the circuit to anticipate the operation of the said circuit controlling elements.

Signed at Philadelphia, in the county of Philadelphia and State of Pennsylvania, this 26th day of December, A. D. 1923.

CHRISTIAN WILHJELM.